Nov. 17, 1959 J. CARDNO 2,912,860
LIQUID LEVEL GAUGE
Filed July 13, 1956 2 Sheets-Sheet 1
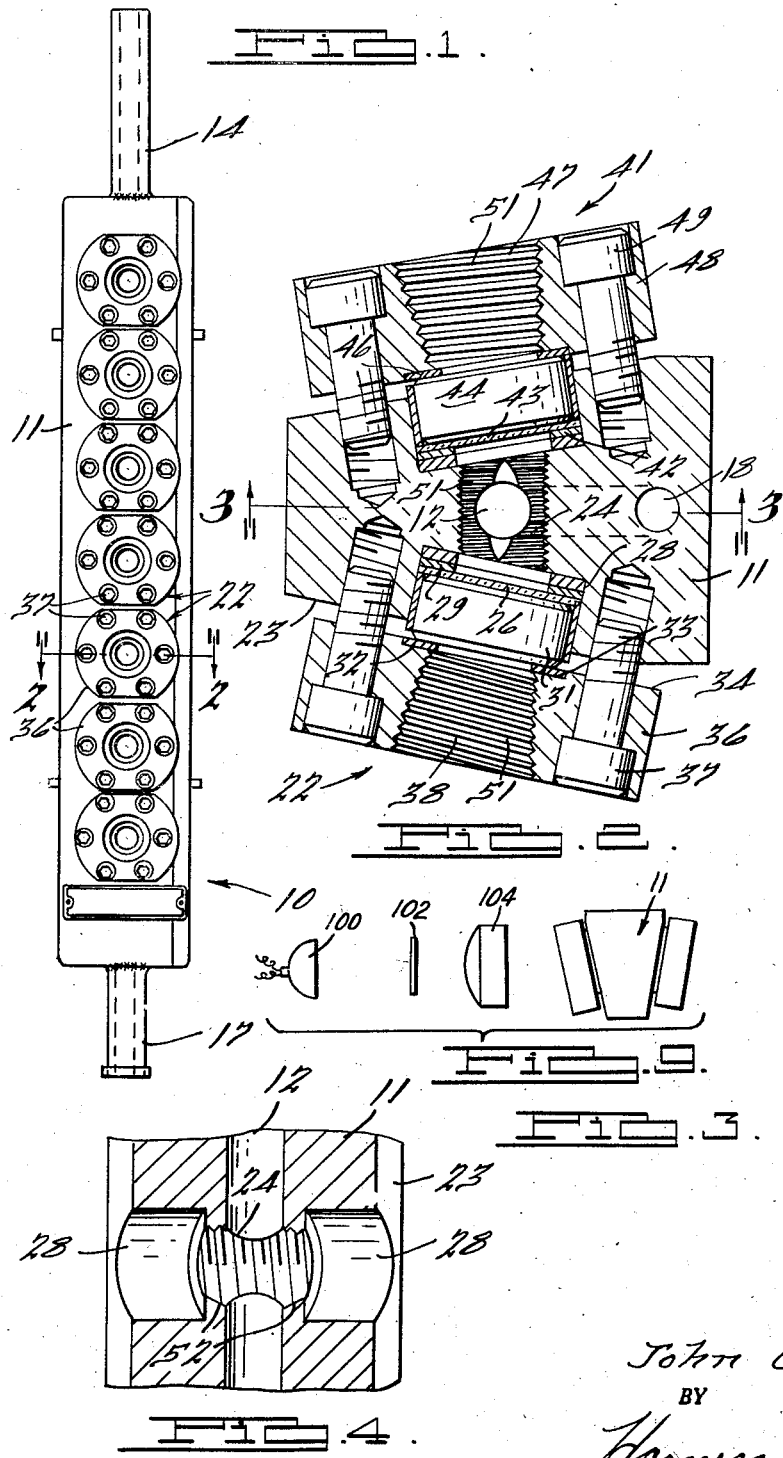
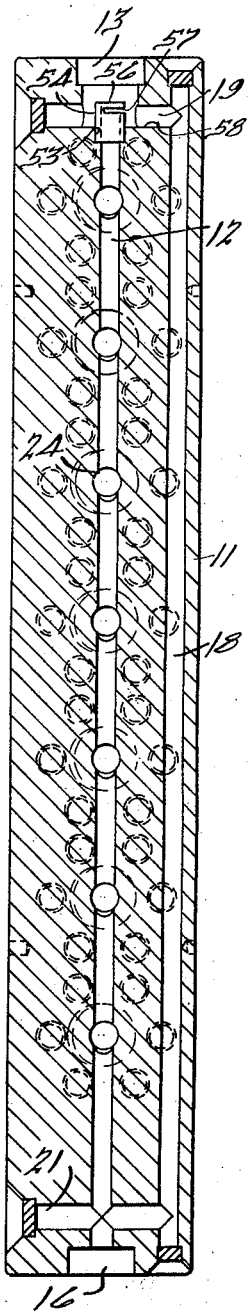
INVENTOR.
John Cardno.
BY
Harness, Dickey & Pierce
ATTORNEYS.

Nov. 17, 1959   J. CARDNO   2,912,860
LIQUID LEVEL GAUGE
Filed July 13, 1956   2 Sheets-Sheet 2
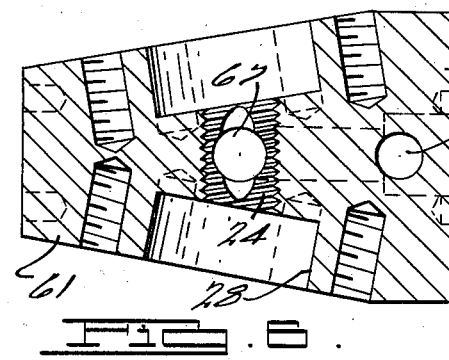
FIG. 6.
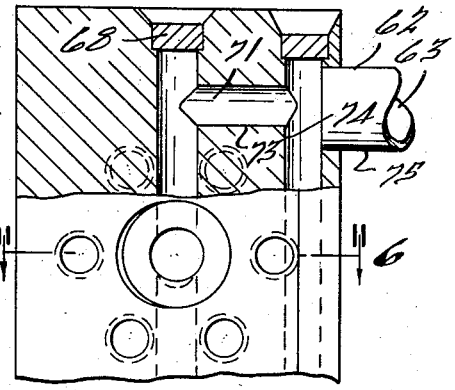
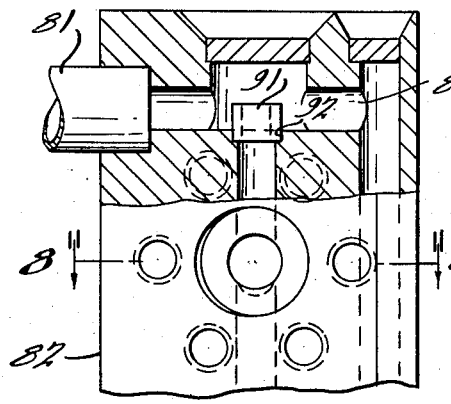
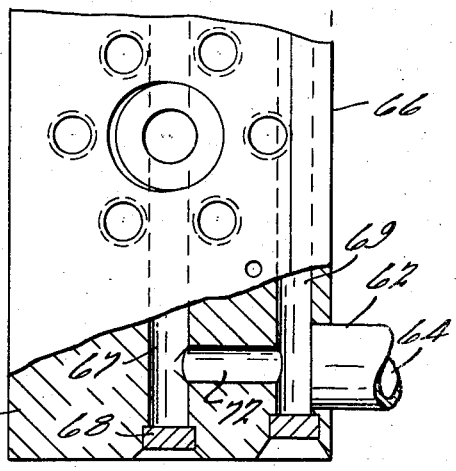
FIG. 5.
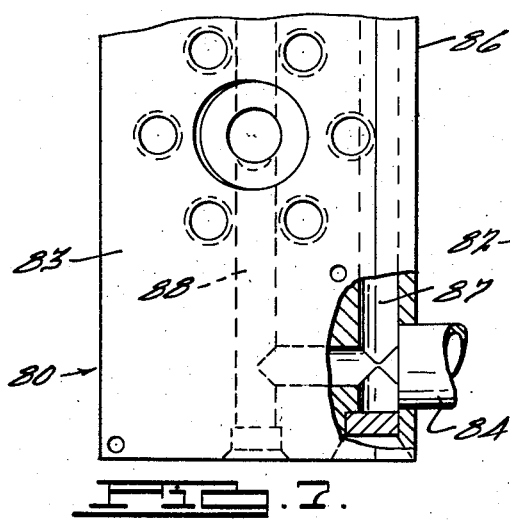
FIG. 7.
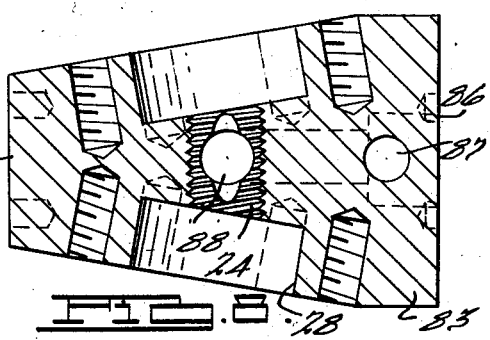
FIG. 8.
INVENTOR.
John Cardno
BY
Harness, Dickey & Pierce
ATTORNEYS.

United States Patent Office 2,912,860
Patented Nov. 17, 1959

2,912,860

LIQUID LEVEL GAUGE

John Cardno, Lancaster, Ohio, assignor to Diamond Power Specialty Corporation, a corporation of Ohio Application July 13, 1956, Serial No. 597,688

4 Claims. (Cl. 73—293)

This invention relates generally to gauges and more particularly to liquid level gauges for high-pressure steam boilers and the like.

In the operation of high-pressure steam boilers, water-column type liquid level gauges are commonly used to provide a continuous visual indication of the water in the boiler. One type of such a gauge, namely, the multiple port type, is illustrated in application Serial No. 486,133, filed February 4, 1955, by William F. Cantieri et al. The use of a bi-color indicating system, such as that disclosed in Patent No. 2,024,815, with such a gauge reduces the possibility of misinterpretation of a gauge indication.

However, in practice it has been found that condensate and trapped water within the gauge may accumulate on a port at a position such that an incorrect water level reading will result. In other words, when using a bi-color indicating system, a water or condensate droplet may be sufficient to refract the light beam in such a manner as to give an impression of a water indicating area in a zone which is actually a steam zone above the true water level. The use of the structure shown in the Cantieri et al. application, which utilizes downwardly sloping surfaces, substantially eliminates any problem of trapped water opposite the viewing ports. However, the draining condensate travelling past the ports cannot be distinguished from the water in the gauge when industrial television is used to view the gauge, as is generally the case with large boiler installations.

It is an object of this invention, therefore, to provide an improved liquid level gauge for steam boilers.

Another object of this invention is to provide a liquid level gauge which includes a by-pass passage for draining condensate into a portion of the gauge remote from the liquid viewing portion of the gauge.

A further object of this invention is to provide a liquid level gauge in which condensate cannot cause an erroneous indication of water level when the gauge is viewed by industrial television.

Another object of this invention is to provide a liquid level gauge in which the water column portion thereof is provided with a cover or deflector to prevent the draining of condensate thereto.

Still another object of this invention is to provide a liquid level gauge which is relatively simple in construction, economical to manufacture, and efficient in operation in giving a true water level indication when the gauge is viewed by industrial television.

Further objects, features and advantages of this invention will become apparent from a consideration of the following description taken in connection with the accompanying drawing in which:

Figure 1 is a front elevational view of a liquid level gauge of this invention;

Fig. 2 is an enlarged sectional view taken substantially along the line 2—2 in Fig. 1;

Fig. 3 is a reduced sectional view taken substantially along the line 3—3 in Fig. 2;

Fig. 4 is an enlarged fragmentary vertical sectional view of a portion of the gauge of this invention, illustrating one of the details of the port construction in the gauge;

Fig. 5 is a foreshortened front elevational view of a modified form of gauge of this invention, with the glass assemblies therefor removed;

Fig. 6 is a sectional view looking along the line 6—6 in Fig. 5;

Fig. 7 is a foreshortened front elevational view of another modified form of gauge of this invention, with the glass assemblies therefor removed;

Fig. 8 is a sectional view looking substantially along the line 8—8 in Fig. 7; and Fig. 9 is a diagrammatic view illustrating the bi-color illuminating system used with the liquid level gauge of this invention.

With reference to the drawing, the liquid level gauge of this invention, indicated generally at 10, is illustrated in Figs. 1, 2 and 3 as including an upright elongated body member or center plate 11. Extending longitudinally of the body member 11 (Fig. 3) is a passage forming bore 12 which communicates at its upper end with a larger opening 13 constituting an extension of the passage 12. The upright opening 13 in turn communicates with a pipe or line 14 (Fig. 1) secured to the body member 11 and connected to a boiler (not shown), the liquid level of which is to be observed. A second opening 16 at the bottom end of the passage 12 communicates with a pipe 17 also connected to the boiler. The pipes 14 and 17 thus serve to support the gauge 10 on the boiler.

Formed in the body member 11 at a position to one side of the passage 12, which will hereinafter be referred to as the main passage, is a by-pass passage 18 which is parallel to the main passage 12. A first horizontal connecting passage 19, adjacent the upper end of the body member 11, extends between the upright passages 12 and 18 and a second horizontal passage 21 extends between the passages 12 and 18 adjacent the lower end of the body member 11.

It is seen, therefore, that water from the boiler to be observed enters the body member 11 through the water line 17, filling the passages 12 and 18 to the level of the water in the boiler. Likewise, steam from the boiler enters the body member 11 through the steam line 14 to fill the passages 12 and 18 with steam above the level of the water therein.

The contents of the main passage 12 are visible through a series of vertically spaced outer gauge glass assemblies 22 mounted on one side 23 of the body member 11 at positions corresponding to apertures 24 formed in vertically spaced portions of the body member 11 in an intersecting relation with the main passage 12. An outer glass assembly 22 includes a transparent barrier 26, preferably made of mica since it is in engagement with the hot fluids, seated within an outer cylindrical recess 28 at one end of a corresponding aperture 24. The barrier 26 is sealed within the recess 28 by means of a gasket 29 which has special characteristics for preventing seepage of the steam or hot water. A gauge glass 31, seated within the recess 28 in an abutting relation with the mica barrier 26, projects beyond the side 23 of the body member 11 for engaging a gasket 32 positioned within a recess 33 formed in the inner face 34 of a cover plate 36. The tightness of the engagement between the several elements is controlled by adjusting machine screws 37 which fasten the outer cover plate 36 to the body member 11. The contents of the main passage 12 are observed through a tapered port 38 formed in the cover plate 36.

A similar inner gauge glass assembly 41 corresponds to and is positioned opposite each outer assembly 22 and includes a gasket 42, a mica barrier 43, an inner gauge glass 44 and a gasket 46 sequentially arranged between the aperture 24 and a tapered port 47 in an inner cover plate 48 which is secured to the body member 11 by screws 49. Thus, when a suitably refracted bi-color light, such as light from a light source 100 directed through a color screen 102 and a strip lens 104, is directed through the tapered aperture 47 and through the transparent inner gauge glass 44, and mica barrier 43 to the fluid filled volume defined by the corresponding aperture 24 and the intersected portion of the main passage 12, the light rays are deflected an extent dependent on the index of refraction of the fluid. The arrangement is such that the rays emanating from one portion of the color screen 102 located behind the inner glass assembly 41, will be directed through the aperture 47, whereas rays emanating from a second portion of the screen will be deflected against the side wall of the port 38, depending upon the nature of the fluid content of the main passage 12 and the aperture 24. As a consequence, a television camera will see a disc of one color if there is steam within the particular viewing port and will see a disc of another color if water is present within that port.

The port openings 38 and 47 and the apertures 24 are serrated (Figs. 2 and 4), as indicated at 51, for the purpose of clarifying the resultant image. The serrations 51 provide for a reflection from the serrated surface which is directed away from the line of view of the boiler operator so as not to impair a precise color identification. As best appears in Figs. 2 and 3, the bottom of each aperture 24 is chamfered to provide surfaces 52 sloping downwardly from the glass assemblies 22 and 41 to the main passage 12. Water drops will thus not adhere to the surface 52 so that no false indication of water in a viewed area will be given as a result of trapped water.

Mounted within an enlarged recess 53 at the upper end of the main passage 12 is a deflector or cover member 54 of substantially tubular shape. The deflector member 54 projects upwardly into the upper connecting passage 19 and has its upper end 56 closed, with the inner diameter of the member 54 corresponding substantially to the diameter of the main passage 12. Immediately below its upper end 56, the deflector member 54 is provided with a horizontal slot 57 to provide for a fluid communication of the main passage 12 and the connecting passage 19.

In use, any condensate flowing down the steam pipe 14 is prevented from travelling into the main or viewing passage 12 by the deflector member 54 which has the slot 57 therefor arranged above the bottom side 58 of the connecting passage 19. Such condensate flows through the connecting passage 19 into the by-pass passage 18, with the water therein adjusting itself to the level of the water in the main passage 12 and the boiler.

Thus, as a result of the provision in the body member 11 of the by-pass passage 18, the condensate cannot run down the portion of the main passage 12 above the water level in the gauge 10 to confuse a gauge viewer. Accordingly, the gauge 10 readily yields an accurate water level picture when viewed by industrial television.

In the modified form 60 of the gauge of this invention, illustrated in Fig. 5, the gauge body member 61 is connected at its thick or by-pass side 66 to horizontal portions 62 of steam and water pipes 63 and 64, respectively. The pipes 63 and 64 are connected to the boiler to be observed so that the gauge 60 is supported on the boiler. By virtue of the connection of the pipes 63 and 64 to the side 66 of the body member 61, the main passage 67 is closed at its upper and lower ends by plugs 68. A by-pass passage 69, in direct communication with the pipes 63 and 64, is connected to the main passage 67 adjacent the upper end thereof by means of a connecting passage 71. A similar connecting passage 72 connects the lower ends of the passages 67 and 69.

In the use of the gauge 60, condensate from the steam pipe 63 travels directly into the by-pass line 71 so that no deflector member, like the member 54 in the gauge 10 is required. The location of the bottom side 75 of the steam pipe 63 below the bottom side 73 of the connecting passage 71 provides for that portion 74 of the wall of the by-pass passage 69 therebetween acting as a deflector to positively prevent travel of condensation from the steam line 63 into the main passage 67.

In the modified form 80 of the gauge of this invention illustrated in Fig. 7, a steam pipe 81 carried by the boiler is connected to the narrow side 82 of the gauge body member 83. A water pipe 84, connected to the thick side 86 (Fig. 8) of the body member 83, communicates directly with the lower end of a by-pass passage 87 to one side of a main passage 88. A connecting passage 89 for the upper ends of the by-pass and main passages 87 and 88, respectively, communicates directly with the steam pipe 81.

Mounted within an enlarged recess 92 at the upper end of the main passage 88 is a tubular nipple or deflector 91 which projects upwardly into the connecting passage 89. As a result, condensate from the steam line 81 which travels directly into the connecting passage 89 for subsequent flow into the by-pass passage 87, is effectively prevented from flowing into the main passage 88 by the upwardly projecting nipple 91.

Since the gauges 60 and 80 are substantially identical with the gauge 10, which was described in detail above, differing only in the connections of the steam and water pipes thereto and the passage formations in the body members 61 and 83, respectively, like numerals on the aperture and port formations have been used to indicate like parts for the gauges 10, 60 and 80. The gauge glass assemblies have not been illustrated for the gauges 60 and 80 since they are identical with the assemblies 22 and 41 illustrated and described for the gauge 10.

From the above description, it is seen that this invention provides liquid level gauges 10, 60 and 80 which insure accurate water level readings without any interference from condensate. By virtue of the provision of the by-pass passages 18, 69 and 87 in the gauges 10, 60 and 80, respectively, when the gauges are viewed by industrial television, there can be no confusion between water and condensate in the gauges.

Although the invention has been described with respect to a preferred embodiment thereof, it is to be understood that it is not to be so limited, since changes can be made therein which are within the scope of the appended claims.

What is claimed is:

1. In a liquid level gauge particularly for indicating the level of water in a boiler or the like, said gauge being of the type which includes a body member having a generally upright elongated index passage and a plurality of vertically spaced transverse walled passages intersecting an intermediate portion of said index passage, a light transmitting barrier closing each end of each of said transverse passages, and a bi-color illuminating system for projecting light of different colors through said transverse passages in such a manner that the transmitted color depends upon the index of refraction of the material in the transverse passages and the intersected portions of the index passage, and wherein any downwardly flowing condensate in said index passage will tend to provide a color indication of liquid for a transverse passage which in fact has vapor in it and is above the liquid level; the improvement which comprises providing an upright by-pass passage in said body member to one side of said index passage and communicating therewith at positions above and below said intermediate portion, and means on said body member located above said intermediate index passage portion for deflecting downwardly traveling condensate in said body member away from said index passage for travel into said by-pass passage.

2. A gauge as defined in claim 1 wherein the deflecting means comprises a tubular member extending upwardly from the upper end of said index passage in a coaxial relation therewith, said by-pass passage has the upper end thereof below the upper end of said tubular member, and a passage for condensate connects the upper ends of said index and by-pass passages.

3. A gauge as defined in claim 1 wherein said deflecting means comprises an upright deflector located between said index and by-pass passages, and a boiler connecting steam line, for communicating said gauge with a boiler therefor, has a portion connected to the body member in substantially horizontal alignment with said deflector.

4. In a liquid level gauge particularly for indicating the level of water in a boiler or the like, said gauge being of the type which includes a body member having index passage means including a plurality of vertically spaced transverse walled passages, a light transmitting barrier closing each end of each of said transverse passages, and a bi-color illuminating system for projecting light of different colors through said transverse passages in such a manner that the transmitted color depends upon the index of refraction of the material in the transverse passages, and wherein any condensate in a transverse passage which is above the liquid level will tend to provide a color indication of liquid for such passage which in fact includes vapor above the liquid level, which comprises providing an upright by-pass passage in said body member to one side of said transverse passages, and means on said body member for deflecting condensate in said body member away from said index passage for travel into said by-pass passage.

References Cited in the file of this patent
UNITED STATES PATENTS

| | | |
|---|---|---|
| 1,202,511 | Groff | Oct. 24, 1916 |
| 1,600,173 | Hogl | Sept. 14, 1926 |
| 1,886,179 | Goodloe | Nov. 1, 1932 |
| 1,954,466 | Aicher | Apr. 10, 1934 |
| 2,220,675 | Boehm | Nov. 5, 1940 |
| 2,603,090 | Brelsford | July 15, 1952 |

FOREIGN PATENTS

| | | |
|---|---|---|
| 717,694 | Germany | Feb. 20, 1942 |